United States Patent [19]
Lee

[11] Patent Number: 6,163,703
[45] Date of Patent: Dec. 19, 2000

[54] METHOD FOR REGISTERING PORTABLE UNIT IN CORDLESS TELEPHONE SYSTEM BY USING BOTH WIRE AND WIRELESS LINKS

[75] Inventor: Kil-Young Lee, Seoul, Rep. of Korea

[73] Assignee: Samsung Electronics Co., Ltd., Rep. of Korea

[21] Appl. No.: 09/017,075

[22] Filed: Feb. 2, 1998

[30] Foreign Application Priority Data

Jan. 31, 1997 [KR] Rep. of Korea .......................... 97-3500

[51] Int. Cl.$^7$ ........................................................ H04B 7/00
[52] U.S. Cl. ............................................. 455/462; 455/550
[58] Field of Search ..................................... 455/418, 419, 455/422, 434, 435, 462, 464, 465, 550, 551

[56] References Cited

U.S. PATENT DOCUMENTS 5,097,500  3/1992  Itoh .......................................... 455/462
5,297,203  3/1994  Rose et al. .
5,509,052  4/1996  Chia et al. .
5,572,574  11/1996  Barnes .

*Primary Examiner*—Thanh Cong Le
*Attorney, Agent, or Firm*—Dilworth & Barrese

[57] ABSTRACT

A cordless telephone system registers a portable unit with a fixed unit by using both wire and wireless links, wherein the portable and fixed units have their own ID numbers. The fixed unit transmits an ID number for the fixed unit, itself, to the portable unit via the wire link, upon receiving registration key data input by a user. Then, the portable unit transmits the received ID number for the fixed unit to the fixed unit together with an ID number for the portable unit, itself, via the wireless link. Upon receiving the ID number for the fixed unit, the fixed unit compares it with an ID number previously stored therein, to register therein the ID number for the portable unit received together with the ID number for the fixed unit, if the previously stored ID number for the fixed unit is identical to the received ID number for the fixed unit.

8 Claims, 8 Drawing Sheets

METHOD FOR REGISTERING PORTABLE UNIT IN CORDLESS TELEPHONE SYSTEM BY USING BOTH WIRE AND WIRELESS LINKS

BACKGROUND OF THE INVENTION

1. Field of the Invention

The present invention relates to a method for registering a portable unit with a specified fixed unit in a cordless telephone system, and in particular, to a method for transmitting ID numbers for portable and fixed units in a cordless telephone system by using both wire and wireless links.

2. Description of the Related Art

In order to register a portable unit with a specified fixed unit, a portable unit first transmits its own ID (identification) number to a fixed unit, and in response thereto, the fixed unit transmits its own ID number to the portable unit.

FIG. 1 is a diagram showing that a cordless telephone system transmits the ID numbers by using a wireless link according to the prior art. As illustrated, when transmitting the ID numbers by using a wireless link (labeled A), the cordless telephone system does not need additional circuitry. However, the portable unit does not know the ID number for the fixed unit with which its own ID number is to be registered. Thus, an unwanted fixed unit may respond to a request for the ID number from the portable unit and transmit its ID number to the portable unit. In order to prevent this, a user should depress a specified key provided on the fixed unit before registering the portable unit. In this case, a fixed unit whose specified key is not depressed by the user does not transmit its ID number to the portable unit, thereby preventing an erroneous registration of the portable unit with that particular fixed unit. However, in the case where a plurality of other fixed units are situated in the vicinity of the particular fixed unit, the user of the portable unit may need to repeatedly perform the above procedure in order to register the portable unit with a desired fixed unit. This results in a disadvantageous increase in the registering time. Besides, the portable unit may be erroneously registered with an unwanted fixed unit which is in the process of performing the registration procedure with other portable units, if any.

FIG. 2 is a diagram showing that a cordless telephone system transmits the ID numbers by using a wire link according to the prior art. As illustrated, when transmitting the ID numbers over the wire link (labeled B), the cordless telephone system may prevent the erroneous registration of the portable unit with the unwanted fixed unit, and reduce the registration time. However, the cordless telephone system needs an additional circuit for transmitting the ID numbers. In this case, the wire link commonly uses a charge terminal. However, by employing the charge terminal approach, a (+) terminal except for a (−) terminal must be connected to the two input/output terminals of the central processing unit (CPU), so that the CPU needs two additional terminals. That is, a bidirectional path must be implemented, as shown in FIG. 2, whereby both the portable unit and the fixed unit must be able to both drive and receive data over the wire link, thus, each requiring an additional terminal.

SUMMARY OF THE INVENTION

It is therefore an object of the present invention to provide a method for rapidly transmitting ID numbers between a fixed unit and a portable unit via both wire and wireless links, without the need for additional circuitry.

According to an aspect of the present invention, a cordless telephone system registers a portable unit with a fixed unit by using both wire and wireless links, wherein the portable and fixed units have their own ID numbers. The fixed unit transmits an ID number for the fixed unit, itself, to the portable unit via the wire link, upon receiving registration key data input by a user. Then, the portable unit transmits the received ID number for the fixed unit to the fixed unit together with an ID number for the portable unit, itself, via the wireless link. Upon receiving the ID number for the fixed unit, the fixed unit compares it with an ID number previously stored therein, to store (register) therein the ID number for the portable unit received together with the ID number for the fixed unit, if the previously stored ID number for the fixed unit is identical to the received ID number for the fixed unit.

BRIEF DESCRIPTION OF THE DRAWINGS

The above and other objects and advantages of the present invention will become more apparent by describing, in detail, preferred embodiments thereof with reference to the attached drawings in which.

DETAILED DESCRIPTION OF PREFERRED EMBODIMENTS

A preferred embodiment of the present invention will be described in detail hereinbelow with reference to the accompanying drawings. For comprehensive understanding of the present invention, the present invention will be illustratively described with respect to a specific embodiment. However, it should be noted that the present invention can be implemented by anyone skilled in the art given the teachings provided herein. In the following description, well-known functions or constructions which may obscure the present invention are not described.

Figure 1:
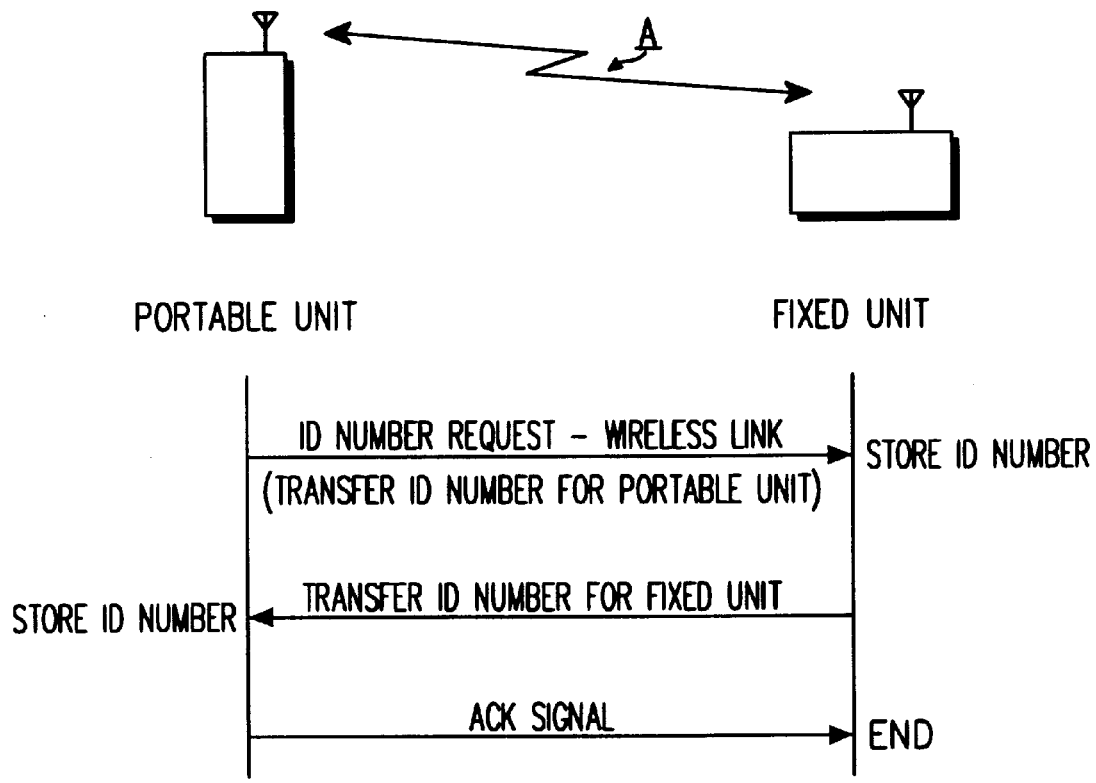
FIG. 1 is a diagram showing a cordless telephone system transmitting ID numbers by using a wireless link according to the prior art.
Figure 2:
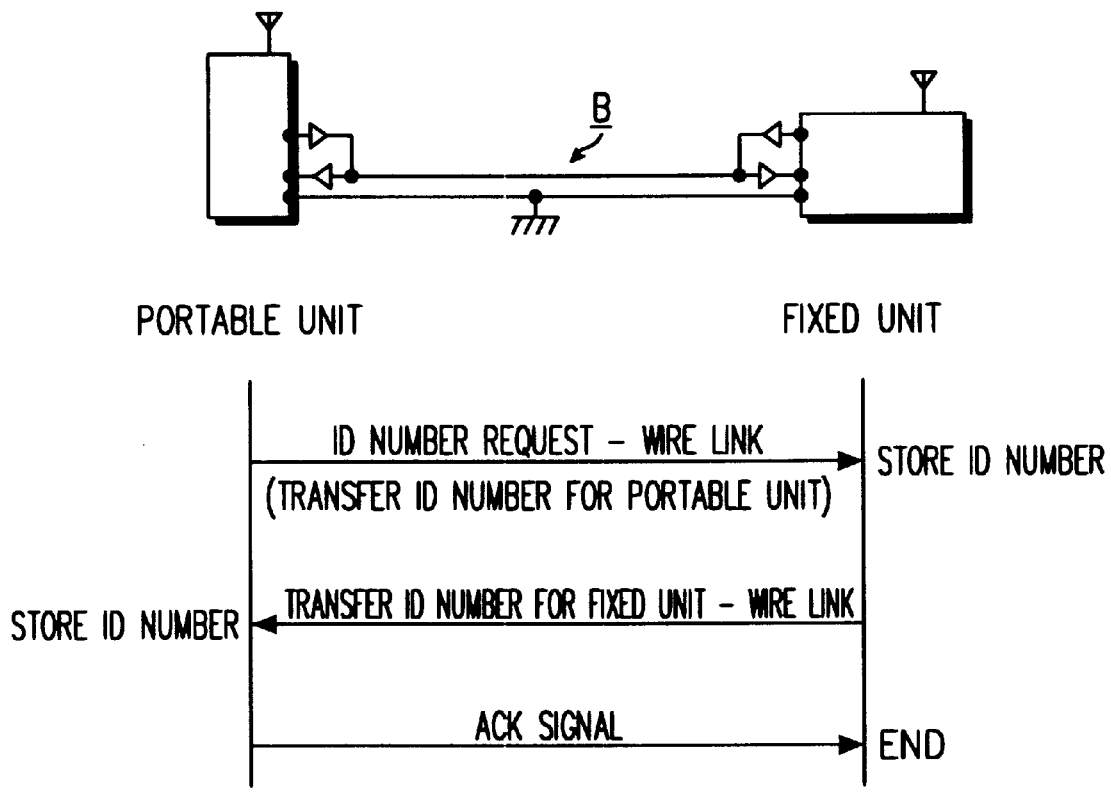
FIG. 2 is a diagram showing a cordless telephone system transmitting ID numbers by using a wire link according to the prior art.
Figure 3:
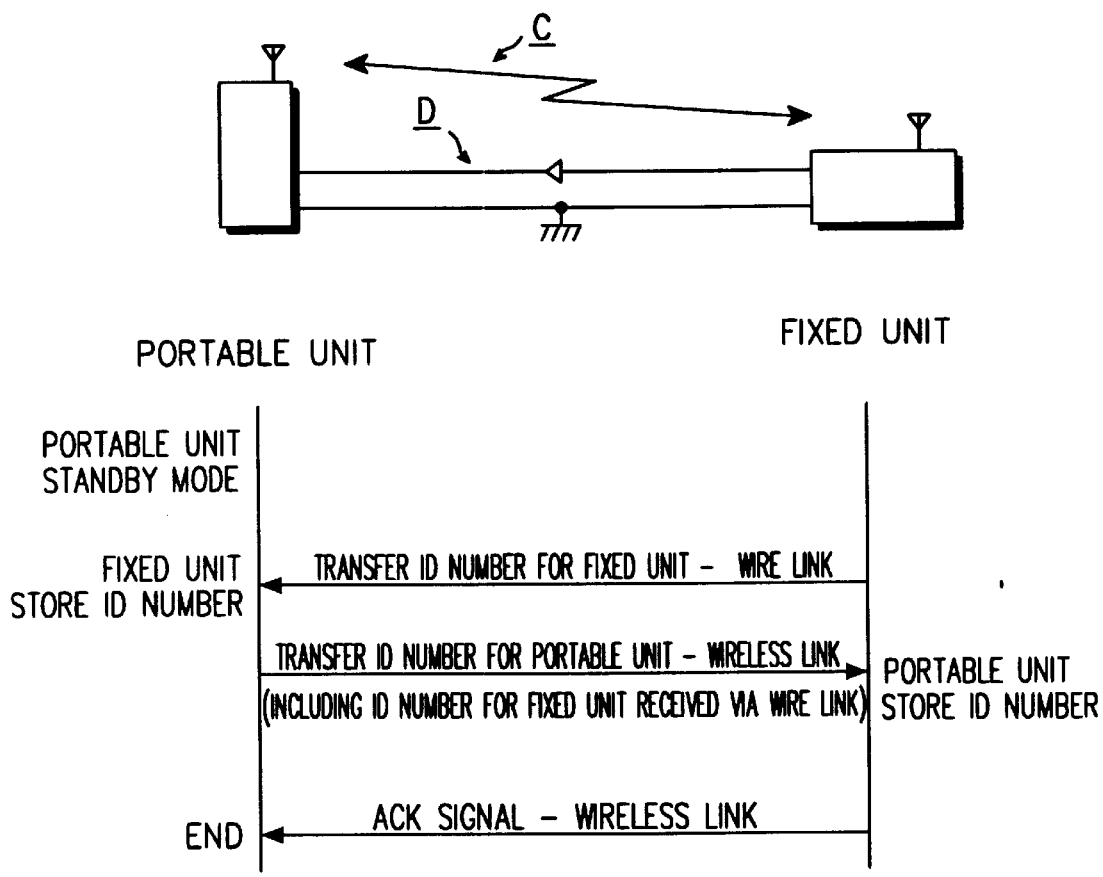
FIG. 3 is a diagram showing a cordless telephone system transmitting ID numbers by using both wire and wireless links according to a preferred embodiment of the present invention.

FIG. 3 is a diagram showing a cordless telephone system transmitting ID numbers by using both wire and wireless links according to a preferred embodiment of the present invention. As illustrated, the ID number for the fixed unit only is transmitted via the wire link (labeled D, while the wireless link is labeled C). Thus, the portable unit need only read a value at a charge terminal, so that the cordless telephone system does not need the additional circuit described with respect to the prior art approach shown in FIG. 2. This is due to the advantage derived from not requiring bidirectional transmission between the portable unit and fixed unit over the wire link D.

Figure 4A:
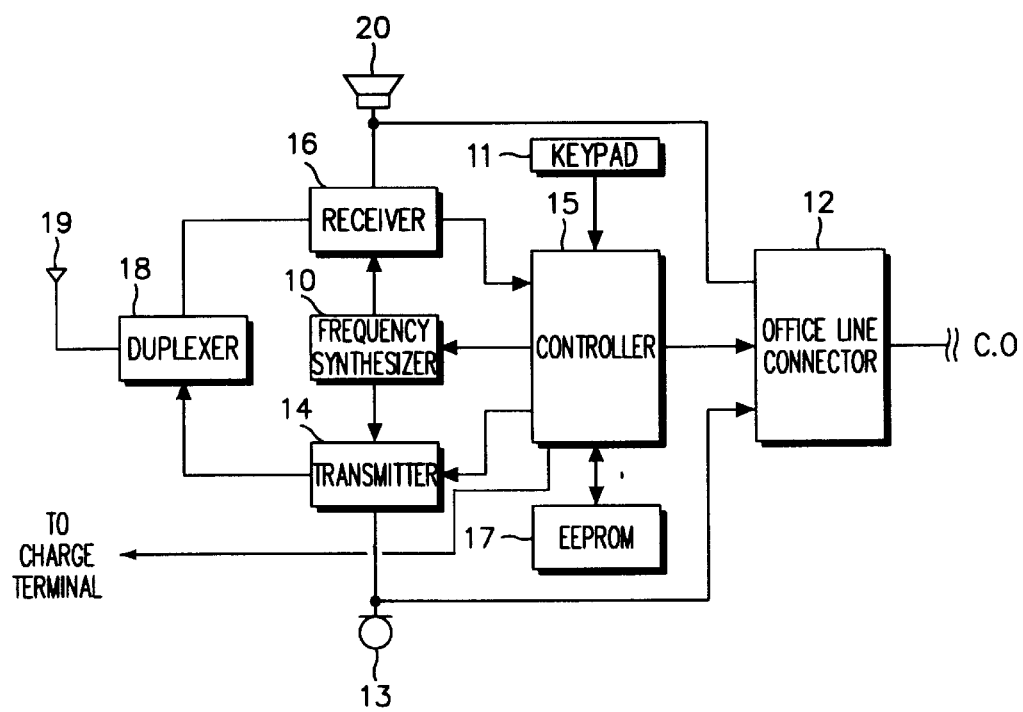
FIG. 4A is a schematic block diagram of a fixed unit for a cordless telephone according to a preferred embodiment of the present invention.

FIG. 4A is a schematic block diagram of a fixed unit for a cordless telephone according to a preferred embodiment of the present invention. As illustrated, the fixed unit includes a keypad 11 consisting of a plurality of keys for dialing a telephone number and registering the portable unit. A controller 15, preferably a single chip microprocessor, controls an overall operation of the fixed unit, and includes a ROM (Read Only Memory) for storing a program and a RAM (Random Access Memory) for temporarily storing data generated during execution of the program. A transmitter 14 modulates digital data output from the controller 15 and an analog voice signal generated from a microphone 13, to generate an RF (radio frequency) signal. A duplexer 18 connected to an antenna 19 separates transmission and reception signals in order to transfer the reception signal from the antenna 19 to a receiver 16 and the transmission signal from the transmitter 14 to the antenna 19. The receiver 16 demodulates the received RF signal from the duplexer 18 and transfers an audio signal to a speaker 20 and digital data to the controller 15, separately. A frequency synthesizer 10 generates a frequency for designating transmission and reception channels for the transmitter 14 and the receiver 16, under the control of the controller 15. An office line connector 12 connected to a telephone exchange system via a telephone line, interfaces a signal (e.g., ring signal) between the fixed unit and a controller of the telephone exchange system and interfaces a voice signal between the fixed unit and the telephone exchange system. An EEPROM (electrically erasable and programmable ROM) 17 stores the ID number for the fixed unit, itself, and an ID number for the portable unit received from the portable unit.

Figure 4B:
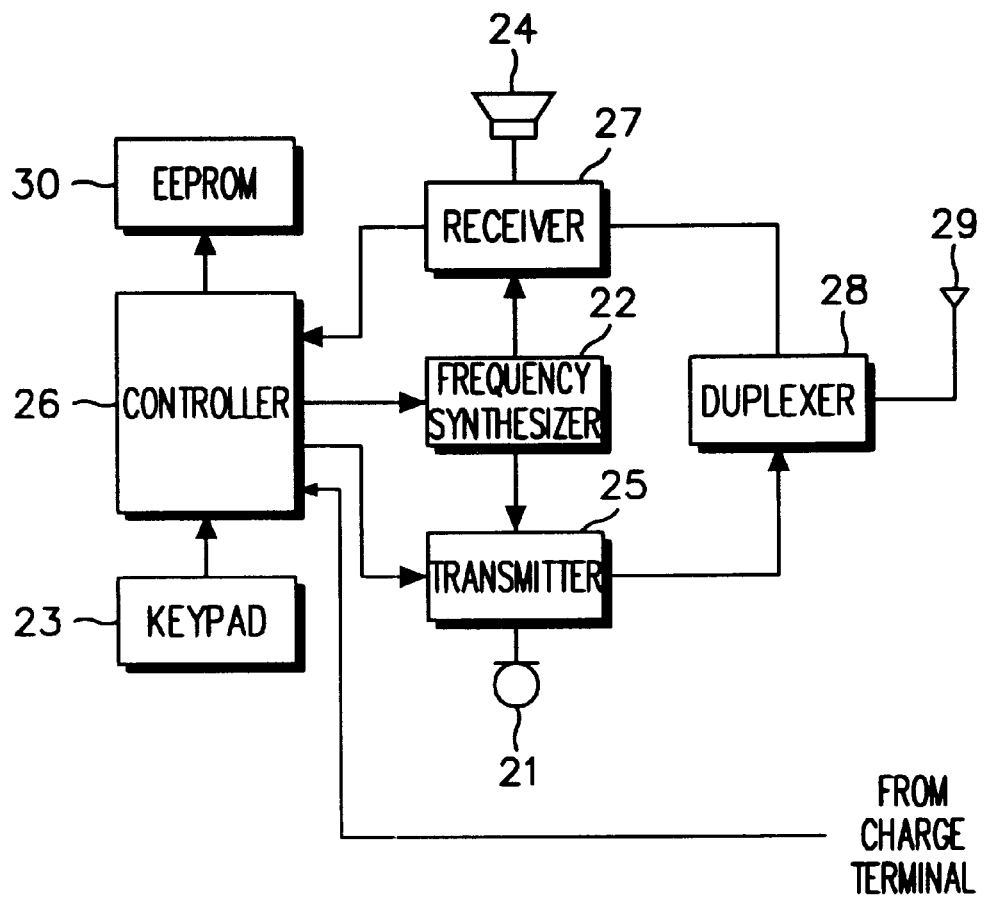
FIG. 4B is a schematic block diagram of a portable unit for a cordless telephone according to a preferred embodiment of the present invention.

FIG. 4B is a schematic block diagram of a portable unit for a cordless telephone according to a preferred embodiment of the present invention. The portable unit includes a controller 26 for controlling an overall operation of the portable unit. A transmitter 25 modulates digital data from the controller 26 and an analog voice signal from a microphone 21, to generate an RF signal output. A duplexer 28 connected to an antenna 29 separates transmission and reception signals, to transfer the RF signal output from the transmitter 25 to the antenna 29 and the received RF signal from the antenna 29 to a receiver 27. The receiver 27 demodulates the received RF signal from the duplexer 28, to transfer the audio signal to a speaker 24 and the digital data to the controller 26, separately. A frequency synthesizer 22 generates a frequency for designating transmission and reception channels for the transmitter 25 and the receiver 27, under the control of the controller 26. A keypad 23 consists of a plurality of keys for dialing a telephone number. An EEPROM 30 stores the ID number for the portable unit, itself, and the ID number for the fixed unit received from the fixed unit.

Figure 5:
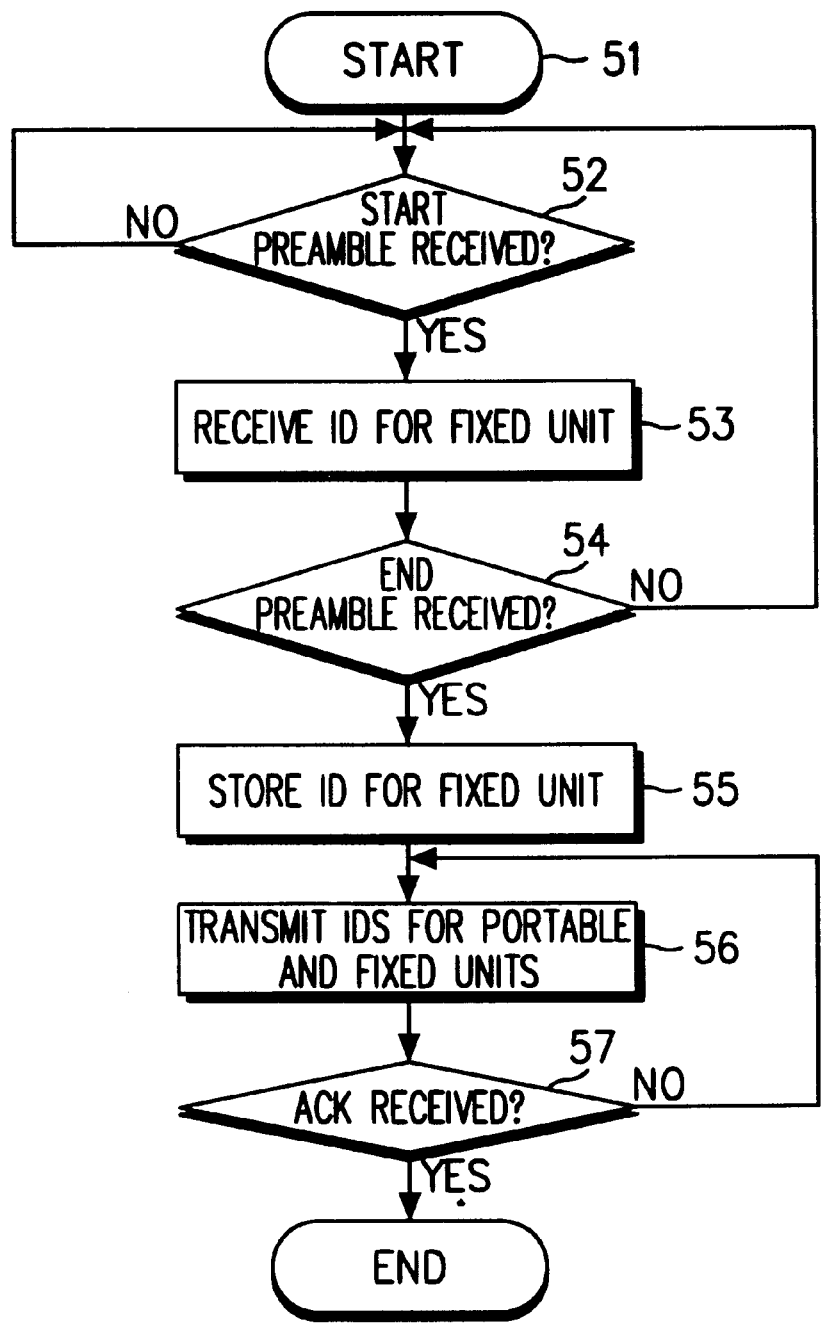
FIG. 5 is a flow chart showing the steps associated with a portable unit for registering the portable unit with the fixed unit according to a preferred embodiment of the present invention.
Figure 6:
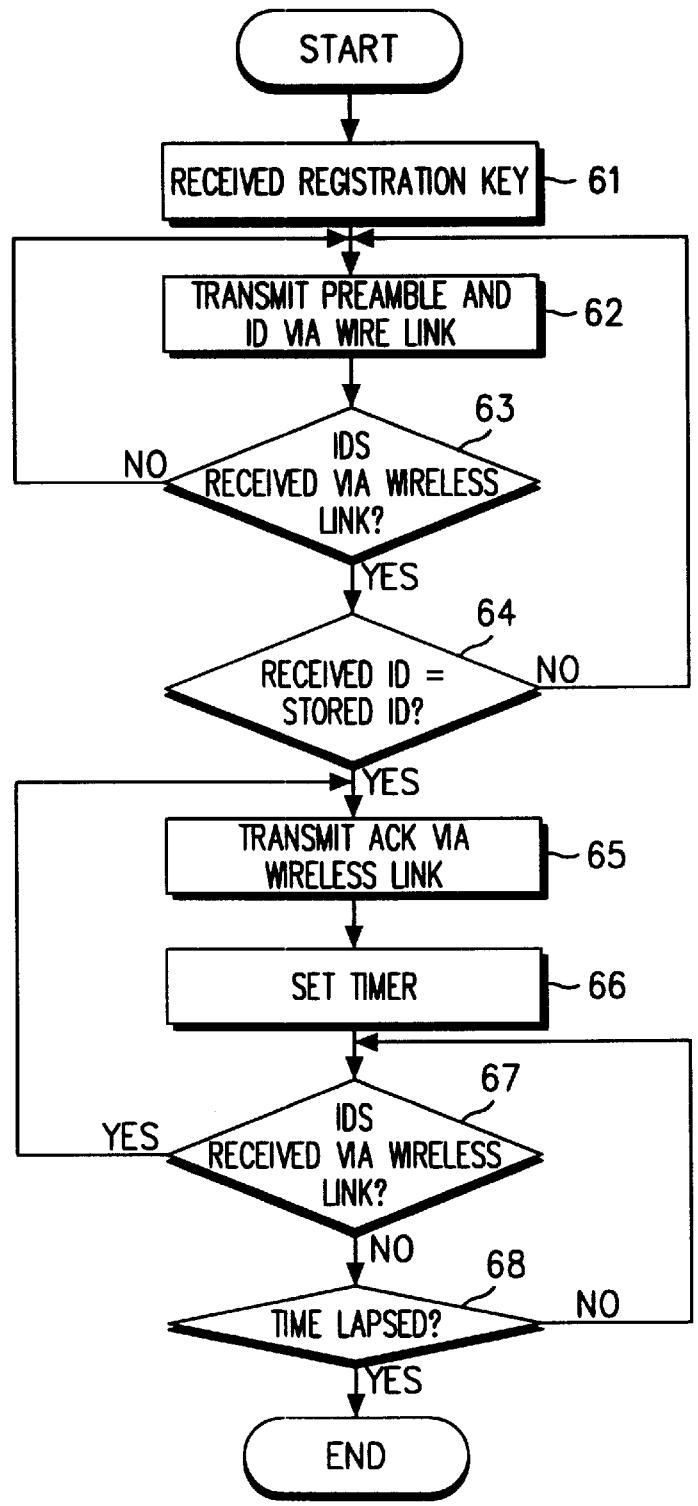
FIG. 6 is a flow chart showing the steps associated with a fixed unit for registering the portable unit with the fixed unit according to a preferred embodiment of the present invention.

FIG. 5 is a flow chart showing the steps associated with the portable unit for registering the portable unit with the fixed unit according to a preferred embodiment of the present invention. FIG. 6 is a flow chart showing the steps associated with the fixed unit for registering the portable unit with the fixed unit according to a preferred embodiment of the present invention. Now, a procedure for registering the portable unit with the fixed unit will be described in detail with reference to FIGS. 4A through 6.

Figure 7:
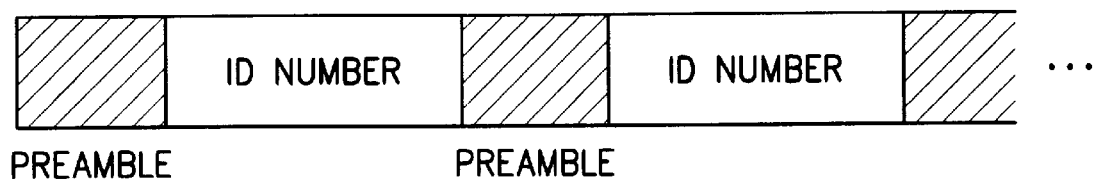
FIG. 7 is a diagram showing a data format of the ID number.

Upon sensing that an unregistered portable unit is put on the fixed unit, the controller 26 of the portable unit is set to a standby mode to wait for the ID number for the fixed unit to be received from the fixed unit (step 51). At this moment, if the user depresses a REGISTRATION key by using the keypad 11 of the fixed unit, the controller 15 of the fixed unit scans the keypad 11 to receive REGISTRATION key data (step 61), and transmits the ID number for the fixed unit, itself, to the portable unit together with preambles representative of start and end portions of the ID number (i.e., a start preamble and an end preamble) via the wire link labeled D in FIG. 3 (i.e., the charge terminal) (step 62). The ID number may have a data format as shown in FIG. 7.

Referring again to FIGS. 4A through 6, the controller 26 of the portable unit repeatedly reads a value at the charge terminal in the standby mode to check whether the start preamble is received or not (step 52). If the start preamble is received, the controller 26 temporarily stores the ID number received from the fixed unit into the RAM (step 53), and checks whether the end preamble, corresponding to the start preamble, is received or not (step 54). If the end preamble is received, the controller 26 stores the ID number into the EEPROM 30 (step 55). However, if the end preamble is not received, the controller 26 deletes the ID number stored in the RAM and returns to step 52 to receive the next start preamble. After completion of receiving the ID number for the fixed unit, the controller 26 of the portable unit transmits the ID number for the fixed unit stored in the EEPROM 30 together with the ID number for the portable unit, itself, to the fixed unit via the wireless link labeled C in FIG. 3 (step 56). Then, the controller 15 of the fixed unit checks whether the ID numbers for the fixed unit and the portable unit are received from the portable unit via the wireless link (step 63). If the ID numbers are received, the controller 15 compares the received ID number for the fixed unit with its own ID number (step 64). As a result, if the two ID numbers are identical to each other, the controller 15 stores (register) the ID number for the portable unit received from the portable unit into the EEPROM 17 and generates an acknowledge signal ACK and transmits the acknowledge signal to the portable unit via the wireless link (step 65). However, if the controller 26 of the portable unit fails to receive the acknowledge signal ACK, the controller 26 of the portable unit re-transmits the ID numbers to the fixed unit (steps 57 and 56). Upon sensing the ID numbers re-transmitted from the portable unit, the controller 15 of the fixed unit again transmits the acknowledge signal ACK to the portable unit via the wireless link (step 65). If the fixed unit again receives the ID numbers from portable unit via the wireless link within a specified time (step 67), it is meant that the portable unit has failed to receive the acknowledge signal ACK. Therefore, the controller 15 of the fixed unit re-transmits the acknowledge signal ACK to the portable unit (step 65). Upon receiving the acknowledge signal ACK (step 57), the controller 26 of the portable unit completes the registration procedure. If further ID numbers are not received from the portable unit within the specified time after transmitting the acknowledge signal ACK (step 68), the fixed unit completes the procedure. In order to check the lapse of the specified time, the fixed unit may use a software timer.

As apparent from the foregoing, the cordless telephone system of the invention can rapidly transmit the ID numbers between the fixed unit and the portable unit using both a wire and a wireless link, without an additional circuit. Therefore, it is possible to accurately register the portable unit with the desired fixed unit quickly.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for transmitting (identification) numbers between a fixed unit and a portable unit by using both a unidirectional wire link and a wireless link in a cordless telephone system, comprising the steps of:

transmitting an ID number for the fixed unit, itself, from said fixed unit to said portable unit via said unidirectional wire link, upon receiving registration key data input by a user;

transmitting the received ID number for the fixed unit from said portable unit to the fixed unit together with an ID number for the portable unit, itself, via said wireless link, for verification purposes; and comparing an ID number previously stored in the fixed unit with said received ID number for the fixed unit, so as to register therein said ID number for the portable unit received together with the ID number for the fixed unit, if said previously stored ID number for the fixed unit is identical to said received ID number for the fixed unit.

2. The method as claimed in claim 1, further comprising the step of transmitting an acknowledge signal from said fixed unit to said portable unit via said wireless link, upon registering therein said ID number for the portable unit.

3. The method as claimed in claim 1, further comprising the step of re-transmitting said ID numbers from said portable unit to said fixed unit, if said portable unit does not receive said acknowledge signal from said fixed unit.

4. The method as claimed in claim 3, further comprising the step of re-transmitting said acknowledge signal from said fixed unit to said portable unit, upon receipt of said re-transmitted ID numbers within a specified time period.

5. A method for registering a portable unit with a fixed unit in a cordless telephone system, said portable and fixed units respectively having a unique ID number associated therewith, comprising the steps of:

upon receiving registration key data input by a user, transmitting the ID number for said fixed unit, itself, from said fixed unit to said portable unit via a unidirectional wire link formed between said fixed unit and said portable unit by way of a charge terminal;

transmitting said received ID number for said fixed unit from said portable unit to said fixed unit together with an ID number for said portable unit, itself, via a wireless link formed between said fixed unit and said portable unit, for verification purposes;

comparing an ID number previously stored in said fixed unit with said received ID number for said fixed unit, so as to register therein said ID number for said portable unit received together with said ID number for said fixed unit, if said previously stored ID number for said fixed unit is identical to said received ID number for said fixed unit; and transmitting an acknowledge signal from said fixed unit to said portable unit via said wireless link, so as to inform completion of the registration.

6. The method as claimed in claim 5, further comprising the steps of:

checking, at said portable unit, whether a start preamble of said ID number for said fixed unit is received from said fixed unit;

upon receiving said start preamble, temporarily storing said received ID number for said fixed unit into said portable unit, and checking whether an end preamble of said ID number for said fixed unit is received from said fixed unit; and storing said ID number for said fixed unit into said portable unit, if said end preamble corresponds to said start preamble.

7. The method as claimed in claim 5, further comprising the step of re-transmitting said ID numbers from said portable unit to said fixed unit, if said portable unit does not receive said acknowledge signal from said fixed unit.

8. The method as claimed in claim 7, further comprising the step of re-transmitting said acknowledge signal from said fixed unit to said portable unit, upon receipt of said re-transmitted ID numbers within a specified time period.

* * * * *